United States Patent Office 3,288,720
Patented Nov. 29, 1966

3,288,720
PROCESS FOR PREPARING A SUPPORTED CATALYST FOR THE STEREOSPECIFIC POLYMERIZATION OF ALPHA-OLEFINS
Giorgio Moretti and Gianfranco Corsi, Ferrara, Italy, assignors to Montecatini Società Generale per l'Industria Mineraria e Chimica, Milan, Italy, a corporation of Italy
No Drawing. Filed Oct. 6, 1961, Ser. No. 146,067
Claims priority, application Italy, Oct. 10, 1960, 17,481/60
18 Claims. (Cl. 252—429)

The present invention relates to a process for the preparation of a supported catalyst containing at least two components, which catalyst is suitable for the stereospecific polymerization of alpha-olefins in the gaseous phase.

Processes for polymerizing alpha-olefins using catalysts having a high stereospecificity containing a halide of a transition metal of the Groups IV, V, VI of the Mendeleeff Periodic Table, having a valence state lower than the maximum state and an organometallic compound of a metal of the Groups II and III of said Periodic Table, are known.

The halides of the above-mentioned transition metals are generally solid and crystalline products, and are usually obtained by reducing the corresponding halides possessing a maximum valence state, which halides are more easily obtainable.

Processes wherein said reduction is possible at high temperatures in the vapor phase with hydrogen or at low temperatures with the aid of organometallic compounds, metal hydrides or metals, are known in the art.

The preparation of said halides having a lower valence state does present some practical problems of great importance.

During the reduction step at high temperatures, the presence of HCl and the high thermal conditions favor corrosion, and in addition, the separation of the solid product both from the condensed phase (by filtration) and from the gaseous one (by means of cyclone separators and washings with liquid halides) is made particularly difficult because of the very high degree of fineness of the product obtained.

The reduction processes conducted at low temperatures, however, also have two main disadvantages:

(1) During the reduction step with the organometallic compound, since the reaction is very exothermic, it is necessary to dilute the reactants or use a great excess of liquid halide. Furthermore, it is difficult to stop the reduction at the first stage and therefore, halides having a lower than desired valence state or a metal are almost always formed. In addition, the preceding difficulties for the separation and purification of the solid (also obtained in this case as a very fine powder) from the excess reactant liquids, always exist.

(2) In the reduction with metals, although the reaction is less exothermic as compared with the high-temperature reaction, it is still always necessary to dilute with a solvent or with an excess of liquid halide. The degree of reduction is more easily regulated, but separation problems similar to the preceding ones due to the fineness of the product, are further complicated by the presence of the reducing metal halide. Similar difficulties also occur in the case of reduction by hydrides.

An outstanding difficulty which occurs upon using solid crystalline halides of the transition metals in alpha-olefin polymerizations, arises when the polymerization is carried out in the absence of a liquid phase.

It is known that stereospecific polymerization processes are possible in the gaseous phase, in the absence of a diluent or liquid monomer, using various procedures.

When it is desired to use crystalline solid halides employing these techniques, the above-mentioned fineness of these halides is a further disadvantage because in a continuous process the gases tend to carry away the finely powdered product and thus require the use of complex separation procedures.

It has been proposed to solve this problem by in some way bonding the catalyst or the halide of the transition metal alone to a granulated inert support, preferably made up of the polymer itself.

Although the possibility of impregnating the support with the liquid halides might be considered, the bonding of the solid halides onto a support is practically impossible, for at best the halides are attached to the support in a very unstable manner so that the carrying phenomena caused by the gases, still persist.

Obviously, the higher the rate of feed gases, the more pronounced is said carrying phenomenon, and this leads to an important disadvantage when particularly high feed rates are used in order to dissipate the reaction heat.

The carrying of the catalyst by the gases also obviously lowers the yields.

In order to overcome these inconveniences, an improved method has been developed, according to which method it is possible to permanently support on a preformed granulated polymer the product obtained from the reduction of a transition metal halide.

This method comprises reducing the maximum valence halide which is impregnated on a granular polymer, by using an organometallic compound which in its turn impregnates a similar support. Thus the two components are reacted by mixing the two differently impregnated supports at a suitable temperature.

The product thus obtained is comparable with the solid crystalline halide of the transition metals in all its polymerization applications, either in liquid or in gaseous phase. Ths product is superior in that it is steadfastly bound to the support, and the above-mentioned carrying problems are eliminated when it is used in gaseous-phase polymerizations, thus making possible the use of high gas rates through the fluid bed.

However, this method has a basic inconvenience in that a high excess of the organometallic compound must be used in order to obtain a complete reduction.

In fact, for example, when aluminium triethyl is used as the organometallic compound and $TiCl_4$ as the maximum valence state transition metal halide, a molar ratio of aluminum triethyl/titanium tetrachloride ranging from 1:1 to 5:1, preferably 3:1, is necessary in order to obtain the best results. This is perhaps due to the fact that because of the porosity of the support, the reaction between the two components is difficult to carry out and therefore, a large excess of organometallic compound is necessary in order to reduce all the metal halide present.

This excess not only adds considerably to the cost of the catalyst, but this excess of organometallic compound can cause the reduction to proceed beyond the desired degree, so that, for example, in the case of titanium tetrachloride, a halide of divalent titanium is also formed, which divalent halide obviously does not act in the same manner as trivalent titanium during the polymerization.

In addition, the washing of the polymers obtained using catalysts supported on polypropylene is very difficult, since the catalyst is bound to a support which is insoluble in the washing medium.

Applicants have now surprisingly found that if the reduction of the transition metal halide to the valence state immediately below its maximum valence by the organometallic compound, is carried out on supports soluble in water or in the washing medium for the polymer, it is possible to obtain in very high yields, compounds very firmly bound onto said above-mentioned supports. Furthermore, since said supports are soluble in the washing medium, they can be easily removed from the polymers themselves at the end of the polymerization.

An object of the present invention is therefore to provide a process for the preparation of a supported catalyst useful for the stereospecific polymerization of alpha-olefins in gaseous phase, particularly propylene, these catalysts containing the halide of a transition metal at a valence state immediately below its maximum valence and of at least an organometallic compound of a metal belonging to the I, II or III groups of the Mendeleeff The halide of the transition metal in a valence state lower than its maximum valence is obtained by reacting the halide of the transition metal in a maximum valence state and an organometallic compound of the same type cited or of a different metal. The process is characterized by the fact that a support, which comprises an inorganic compound soluble in water or in the polymer washing agents, inert towards the catalyst components, and impregnated with the organometallic compound, is reacted with an excess of a halide of the maximum valence transition metal and subsequently is heated to a temperature above 150° C., desirably under vacuum.

A further amount of organometallic compound impregnated on the same or a different support, may be added.

All the inorganic compounds which are soluble in the polymer washing agents normally used for alpha-olefin polymers obtained with the aid of stereospecific catalysts may be used with success as supports. Water, ketones, alcohols, and their water solutions desirably in a more or less acid medium and which are inert with respect to the catalysts components are examples of washing solvents.

In order to illustrate but not to limit the invention, $CaCO_3$, $CaCl_2$, $MgCO_3$, $K_2SO_4$, $Na_2SO_4$, NaCl, etc., may be mentioned as examples of such supports.

These supports should preferably not be powdered but in granular form so that they are not carried away by the gaseous stream in polymerization carried out in the gaseous phase using working conditions commonly employed in the fluid beds techniques.

The size of the granules depends on their nature. For example, $CaCO_3$ granules have been used obtained by milling marble splinters and then screening and collecting the fraction from the 400 mesh/cm.$^2$ screen and which passed through the 200 mesh/cm.$^2$ screen; or the residual fraction from a 870 mesh/cm.$^2$ screen.

In the case of $CaCl_2$ which is much lighter and porous, granules having a diameter of from 0.95 to 1.5 mm. have been used; for NaCl, granules having a diameter ranging from 0.1 to 0.3 mm. have been used.

As examples of the halide of the transition metal which can be bound onto the soluble support, according to the present invention, titanium or vanadium halides and particularly chlorides may be mentioned.

As the organometallic compound, lithium butyl, beryllium diethyl, zinc diethyl, aluminum triethyl or triethyl aluminum etherate, and the like, may be used. In addition to the above-mentioned compounds, the dialkyl aluminum halides such as diethyl-aluminum monochloride, diethylaluminum monoiodide, etc., can be used with success. In the latter case, the amount of the transition metal halide is lower than that obtained by working with trialkyl aluminum compounds.

According to the present invention, the molar ratio in the catalytic system between the organometallic compound and the halide of the transition metal in a valence state immediately below its maximum must be kept between 1:1 and 10:1, preferably between 3:1 and 7:1.

In further describing the present invention, the halides of the transition metals will henceforth always, for the sake of brevity, be referred to as titanium chloride, whereas the organometallic compounds of the metals belonging to I, II and III group of the Mendeleeff Periodic Ttable will always be referred to as aluminum triethyl and diethyl-aluminum monochloride, respectively. It is to be understood that this designation is not intended to limit the present invention.

Applicants have observed that when, according to the present invention, an aluminum trialkyl, for example, is dispersed on granules of $CaCl_2$ (or NaCl or $CaCO_3$, or any suitable inorganic compound soluble in the washing agents and inert with respect to the components of the catalytic system), and the granules impregnated with the aluminum trialkyl are then slowly admixed with excess titanium tetrachloride, the reaction between the alkyl-aluminum and titanium tetrachloride is at a certain temperature so rapid that the reaction product remains firmly bound to the support. More precisely, the aluminum alkyl is unable to diffuse into the liquid titanium tetrachloride from the surface of the impregnated granules in order to react and to give a very finely divided dust, as would occur by dropping the aluminum alkyl, diluted in an inert solvent, onto the titanium tetrachloride, but the aluminum alkyl reacts instantaneously on the surface of the support and the reduction product therefore remains firmly anchored.

The higher the temperature of titanium tetrachloride, the greater is the effectiveness of the support. In fact, if the granules of the support impregnated with aluminum alkyl are caused to fall down on $TiCl_4$ maintained at boiling temperature, practically all of the reduction product is supported. Upon working at room temperature, a certain amount of non-supported powder of the reduced titanium halide is present, since the reaction between the titanium tetrachloride and alkyl aluminum is less rapid at room temperature.

Good results are also obtained by introducing the granules of the support impregnated with alkyl aluminum into a tube in which titanium tetrachloride vapors are present at temperatures higher than the boiling temperature of titanium tetrachloride itself.

By working according to the present invention, the product contains higher yields of reduced titanium halide than alkyl aluminum, because a large excess of titanium tetrachloride is used. Generally, the yield in moles of the reduction product amounts to two or three times the number of mols of trialkylaluminum employed.

It has been found that by working on considerably porous supports as, for example, $CaCl_2$, the amount of aluminum alkyl adsorbed being equal, lower amounts of reduction product are obtained than by working with less porous supports, such as $CaCO_3$ or NaCl. This fact can be explained by theorizing that part of the alkylaluminum is adsorbed on the inside of the $CaCl_2$ granules and that, since the granule is covered with the reduced titanium halide thus formed, that portion of the alkylaluminum which has been adsorbed more deeply by the granule has little possibility of taking part in the reaction.

On the other hand, with less porous supports the alkyl-aluminum is adsorbed only on the surface and therefore is able to react almost completely.

Another advantage of working according to the present invention is that, since a large excess of titanium tetrachloride is used, the reduction does not proceed beyond the first stage. Thus, the reduction product obtained by working with titanium tetrachloride at the boiling temperature is colored red-violet, the well known color of titanium trichloride. Furthermore, upon analysis the product has been found to contain only trivalent titanium and no divalent titanium.

However, when the reduction is carried out at room temperature, the color of the product is not violet, but brown.

The excess of titanium tetrachloride at the end of the reduction can be removed by known methods, for example, by washing with inert solvents such as hydrocarbons or simply by heating, preferably under vacuum. The reaction mass in this latter case is merely subjected to a distillation of the titanium tetrachloride, with an almost complete recovering.

The titanium tetrachloride supported reduction products, together with organometallic compounds of the metals of I, II and III group of the Periodic Table, form highly stereospecific catalysts for the polymerization of alpha-olefins and particularly for propylene.

A very convincing proof of the effective cohesion between the reaction products of the present invention may be had by charging a small amount of each product into a glass tube having a 30 mm. diameter, 500 mm. height, and filled with heptane, shaking for a long time until homogenization is reached, and then decanting the suspension.

It is observed that the reaction products decant very rapidly, within a few seconds, and with substantially the same rate at which the support materials alone decant. In comparison, when working with a mixture consisting of a support and $TiCl_3$ obtained according to another method (for example, by reduction of titanium tetrachloride with hydrogen, with metals or organometallic compounds in the absence of a support), a rapid decantation of the support is observed (a few seconds) along with a very slow decantation of titanium trichloride (from 2 to 15 minutes and over, depending on the fineness of the product).

The product obtained by reduction of the halide of the transition metal on a support, according to the present invention, is then mixed, using known methods, with the other component which forms the catalytic system, i.e., the organometallic compound of a metal belong to the I, II or III group of the Mendeleeff Periodic Table. This other catalyst component is eventually supported on an analogous or different support material, for example, a polymer of the olefin which is to be polymerized.

The higher the reduction temperature, the higher is the stereospecificity of the supported catalysts obtained according to the present invention.

It has also been surprisingly observed that upon removing the excess titanium tetrachloride by heating the supported reaction product, an increase in the stereospecificity of the catalyst is attained.

Preferably, this heating can be carried out under a high vacuum or under an inert gas stream, such as nitrogen, or under a mild vacuum using a slow gas flow. In this way the last traces of titanium tetrachloride, which are still present, and the side products of the reduction process which are volatile or able to be sublimated, and which may lower the stereospecificity of the catalyst, are removed.

The possibility of improving the stereospecificity of the catalysts supported on salt-like inorganic compound supports by applying additional heat, is another advantage of the present invention in comparison with processes wherein the catalyst is supported on a polymer such as polypropylene, since the reduction product supported on polypropylene should not be heated to a temperature over 150° C., due to the particular nature of this polymer.

Upon using a support such as $CaCl_2$, it has been observed that the best results with respect to stereospecificity of the catalyst (due to the characteristics of the polymers obtained) are obtained by a heating step under vacuum or under a nitrogen stream, at temperatures between 250° C. and 350° C.

It is also possible to work at lower temperatures, but in this case the increase of the catalyst stereospecificity due to the additional heat is less pronounced.

By working at temperatures over 350° C. (e.g., 400° C. and over) the catalytic stereospecificity further increases and in fact the polymers thus obtained have a high content of isotactic polymer, but at the same time, a rapid decrease in catalytic activity occurs, and polymer yields are lower per unit weight of the catalyst.

Analogous results are obtained with $CaCO_3$.

When working with NaCl in this manner, the capability of the reduction product to react with the support is observed, from temperatures of about 250° C. In fact, this product tends to become clear and changes from a dark red-violet color to pink, and the catalytic activity decreases suddenly. In this case, very good results are obtained by carrying out the heating at about 220° C., under a mild vacuum (10 mm. Hg) and keeping a slow nitrogen flow.

In regard to the concentration of the reduction product on the support per unit of weight, any catalytic amount is suitable. However, a lower limit can easily be arrived at by determining the point beyond which the reduction product should not be diluted, in order not to have present an excessive amount of support per unit of weight of the polymer obtained, which support must be removed by washing.

As for the upper limit, this depends on many factors:

(a) On the type and the porosity of the support, for example, $CaCl_2$ or NaCl;

(b) On the preliminary treatment undergone, since it is obvious that said supports must be perfectly anhydrous and therefore they must be heated at a more or less high temperature in order to dehydrate them before impregnation with the organometallic compound; if they tend to give hydrates as in the case of $CaCl_2$, their surfaces will have a different appearance according to whether the dehydration is carried out by melting or heating under vacuum at a temperature lower than the melting temperature;

(c) On the size of the granules.

The gaseous phase polymerization process for alpha-olefins conducted in the presence of a catalytic system supported on an inorganic compound soluble in the normally used washing agents for the alpha-olefin polymer, is preferably carried out employing fluidized bed techniques. The organometallic compound is introduced into the reactor in the vapor phase, by bubbling either within it or within its solution in an inert solvent the gaseous olefin to be polymerized. While the supported reduction product of the transition metal halide is separately introduced by means of a dosimeter; or by adsorbing the organometallic compound on an inert support analogous to or the same as that used for supporting the reduction product of the transition metal halide, or even different from this support, provided that the support is inert with respect to the catalytic components such as granular polypropylene; then the two supported catalyst components may be introduced separately or together into the reactor.

This latter operating expedient is found particularly suitable when the polymerization is carried out batchwise in the gaseous phase, using an autoclave and without recycling of the gaseous olefin, so that the olefin is continuously fed as it is consumed, and with vigorous stirring of the supported catalyst and the growing polymer product by means of a suitable stirrer.

Whatever manipulations are used to carry out the gaseous phase polymerization, the polymers obtained with the supported catalyst of the present invention are granular, not powderlike, and have a high apparent density. This is particularly advantageous when the polymerization is carried out in a continuous process using a fluidized bed.

It has been observed that when using the above-mentioned supported catalyst, no substantial entrainment or carrying off of either the catalyst or the polymer product occurs. In addition, even when the linear flow rates of the gases are high, after long polymerization runs, there is observed no significant amounts of polymers present, either in the upper part of the reactor or in the following separators or filters.

Furthermore, the presence of the inorganic support does not make the washing of the polymer products in order to remove the occluded catalyst residues more difficult, but makes this removal easier. The catalyst is built on the support and on it the polymer grows. As the support is relatively easy to remove by means of the normally used washing agents, such as aqueous-alcoholic acid solution, in which it is soluble, the catalyst is also easy to remove. For example, a mixture comprising 3 parts of isobutyl alcohol, 1 part water, and an amount of HCl which is at least twice the stoichiometric amount necessary to transform the catalyst residues into soluble halides maintained at the boiling temperature, has been shown to be very efficient for washing the polymers obtained from catalysts supported on water-soluble substances, such as NaCl, $CaCl_2$, etc.

When a support which is insoluble in water but soluble in an acid medium, such as $CaCO_3$, is used, it is necessary to add HCl continuously in order to decompose the carbonate. The carbon dioxide which in this case evolves, disperses the polymer and the washing thus becomes even more simple.

The following examples are given to illustrate the present invention, but are not intended to limit its scope.

All proportions are by weight unless otherwise indicated.

The pressures are given in the examples in absolute atmospheres.

*Example 1*

20 g. of $TiCl_4$ are introduced under nitrogen into a glass flask provided with a reflux cooler and stirrer. Then, into the boiling liquid under stirring, over a period of 20 minutes, 100 g. of $CaCo_3$ are added. The $CaCo_3$ is in the form of granules which have been passed through a 400 mesh/cm.$^2$ screen, obtained as residue from an 870 mesh/cm.$^2$ screen, and soaked with 0.5 g. of aluminum triethyl in 30% heptane solution.

After having completed the addition of the granules, the mass is stirred for a further 30 minutes at the same temperature. Then the excess of titanium tetrachloride is eliminated by heating under vacuum to a temperature of 150° C.

Finally, the product is introduced into a glass tube having a 40 mm. diameter and said tube is brought into a stove kept at 300° C. and is heated, under a vacuum of 1 mm. Hg, at said temperature, for 3 hours.

In the final product (about 100 g.), the granules have a red-violet color and no powder is observed.

The heptane suspension of a part of the product, introduced in a tube having a 40 mm. diameter and 500 mm. height, decants almost completely within a few seconds.

The analysis for trivalent titanium shows that 1.7% of $TiCl_3$ is present, while tetravalent Ti is present only in insignificant amounts.

From this analysis, a molar ratio of $TiCl_3$/triethyl aluminum of 2.5 is indicated.

71 g. of said product (which therefore contains 1.2 g. of $TiCl_3$) are mixed in a glass flask with 25 g. of polypropylene granules (diameter=about 1 mm.), soaked with 3 g. of aluminum triethyl. The mixture is then introduced in a 3-liter autoclave provided with a blade vertical stirrer operating at 200 r.p.m., with a thermometric sheath. There is an inlet valve for feeding the gaseous olefin and means for circulating oil in a jacket in order to keep the temperature constant.

Gaseous propylene is introduced at 6 atmospheres, and this pressure is kept constant for 7 hours at 75° C.

At the termination of the reaction, after cooling, 635 g. of a granular product are discharged. This corresponds at 540 g. of polymer without counting the inorganic support and of the polymer granules which were added. There is a yield of 128 g. per g. of catalyst and 64 g. per g. of $TiCl_3$ per polymerization hour.

The product is washed with a mixture consisting of water and methanol (1:1), with the continuous addition of HCl in order to decompose the carbonate.

After drying, the product, which practically contains no $CaCo_3$, has the following characteristics: [$\eta$] (measured in tetrahydronaphthalene at 135° C.)=2.53; residue after the boiling heptane extraction=83%; flexural rigidity=9,200 kg./cm.$^2$.

*Example 2*

(a) By working according to the procedures described in the Example 1, 750 g. of $CaCO_3$ (granules passed through a 400 mesh/cm.$^2$ screen and obtained as residue from an 870 mesh/cm.$^2$ screen) soaked with 10 g. of triethyl aluminum, are added to 300 cc. of titanium tetrachloride at the boiling temperature.

After the addition of the granules, the mass is heated under reflux for 30 minutes and then the excess titanium tetrachloride is recovered by heating up to 150° C. under vacuum. Finally, the mass is heated for 3 hours, at 300° C. under a 1 mm. Hg vacuum.

The product (about 780 g.) is present as granules homogeneously colored a red-dark violet, and is practically powder free. It decants within a few seconds from a heptane suspension. Upon analysis it is determined that 4.8% of $TiCl_3$ is present, and the molar ratio $TiCl_3$/aluminum triethyl=2.75.

(b) The reaction is carrie dout under the same conditions described in (a), the only difference being that the $CaCO_3$ granules are larger and therefore possess a lower specific surface. These granules have been passed through a 200 mesh/cm.$^2$ screen and obtained as residue from a 400 mesh/cm.$^2$ screen.

The product produced (about 780 g.) is in the form of red-dark violet granules and is practically powder free, even if the total surface of the granules is lower than that used under (a).

The analysis shows that 5% of $TiCl_3$ is present and therefore the molar ratio of $TiCl_3$/triethyl aluminum is 2.85.

*Example 3*

By working under the same conditions described in Example 1, 750 g. of $CaCO_3$ (granules passed through a 400 mesh/cm.$^2$ screen and obtained as residue from an 870 mesh/cm.$^2$ screen) soaked with 12 g. of triethyl aluminum are added to 300 cc. of boiling $TiCl_4$. After the addition has been completed, the mass is heated for a further 30 minutes at the boiling temperature of $TiCl_4$ and then is heated under vacuum up to 150° C. in order to recover the excess $TiCl_4$.

A portion of the product, about 100 g., is not further treated, while the remaining part is heated under a 1 mm. Hg vacuum at 300° C. for 3 hours, and then 670 g. of final product is obtained.

Analysis of trivalent Ti both in the treated portion and in the part that has not been heated shows that 6% $TiCl_3$ is present and thus the molar ratio of titanium trichloride/triethyl aluminum is 2.85.

(a) 20 g. of the product that has not been heated at 300° C. and containing 1.2 g. of $TiCl_3$ are mixed with 25 g. of polypropylene granules (diameter 1 mm.) soaked with 3 g. of aluminum triethyl.

The whole is introduced in a 3-liter autoclave and the propylene is polymerized as described in Example 1, at 75° C. and at 6 atmospheres. After 7 hours, 510 g. of polymer, not considering the initial support material, are discharged with a yield of 122 g. per g. of catalyst and 61 g. per g. of $TiCl_3$ per hour.

After removing $CaCO_3$ by washing with water, methanol and HCl, and drying the product, the polymer presents the following characteristics: [$\eta$] (determined in tetrahydronaphthalene at 135° C.)=2.66; residue after the extraction with boiling heptane=81.5%; flexural rigidity=7,500 kg./cm.$^2$.

(b) 20 g. of the product, heated at 300° C., are mixed with 25 g. of polypropylene in granules (diameter 1 mm.) containing adsorbed thereon 3 g. of aluminum triethyl.

The mixture is introduced into a 3-liter autoclave and the propylene is polymerized as described in Example 1, at 75° C. and 6 atmospheres, for four hours.

290 g. of polymer, not counting the initial support material, are obtained, with a yield of 69 g. per g. of catalyst and 60 g. per g. TiCl$_3$ per hour.

This polymer, after having been washed with a mixture consisting of water, methanol and HCl, and dried, presents the following characteristics: [η] (determined in tetrahydronaphthalene at 135° C.)=2.72; residue after extraction with boiling heptane=84.3%; flexural rigidity=9,400 kg./cm.$^2$.

(c) 20 g. of the product, which has been heated at 300° C., are mixed with 25 g. of polypropylene granules containing adsorbed thereon 3 g. of aluminum triethyl.

The mixture is introduced into a 2-liter autoclave provided with a propeller stirrer operating at 300 r.p.m., a thermometric sheath, an inlet valve for the gaseous olefin, and heated by means of an oil bath.

Gaseous butene-1 is introduced and the polymerization is carried out at 75° C. by keeping the pressure constant at 6 atmospheres for 6 hours.

160 g. of polymer, not counting the initial support material, are obtained. This product, after washing with water and methanol in the presence of HCl and drying, presents the following characteristics: [η] (determined in tetrahydronaphthalene at 135° C.)=2.06; residue after extraction with boiling ether=81.5%.

*Example 4*

By working under the conditions described in Example 1, 750 g. of NaCl (in granules having 0.1–0.2 mm. diameter) containing adsorbed thereon 10 g. of triethyl aluminum, are slowly added to 300 cc. of TiCl$_4$ at boiling temperature.

After having completed the addition, the mixture is heated for a further 30 minutes at the same temperature, and then the TiCl$_4$ in excess is recovered by heating up to 150° C. under vacuum.

The product is then heated for 90 minutes at 190° C., under a 1 mm. Hg vacuum.

780 g. of product, powder free, colored red-violet, and containing, as shown by analysis, 5% TiCl$_3$, are obtained. Molar ratio TiCl$_3$/triethyl aluminum=2.85.

24 g. of said product, containing 1.2 g. TiCl$_3$, are admixed with 25 g. of polypropylene granules containing adsorbed thereon 3 g. of aluminum triethyl. The mixture is introduced into an autoclave and the propylene is polymerized as described in Example 1, at 75° C., 6 atmospheres, for 7 hours.

550 g. of polymer, free from the initial support material, are obtained with a yield of 131 g. per g. catalyst and 65 g. per g. of TiCl$_3$ per hour.

The polymer, after washing with a mixture water-methanol in the presence of small amounts of HCl, presents the following characteristics: [η] (measured in tetrahydronaphthalene at 135° C.)=2.16; residue after extraction with boiling heptane=75%; flexural rigidity=7400 kg./cm.$^2$.

*Example 5*

By working under the conditions described in Example 1, 100 g. of NaCl in granules (diameter 0.1–0.2 mm.) containing 1.65 cc. of an adsorbed 37.5% heptane solution of aluminum triethyl, are slowly added to 20 g. of boiling TiCl$_4$.

After the addition is completed, the mixture is heated for a further 30 minutes at the same temperature and then the excess TiCl$_4$ is removed by heating up to 150° C. under vacuum.

The product is finally heated for 90 minutes at 300° C. under a 1-mm. Hg vacuum. The final color is bright violet. Analysis shows that 2.5% of TiCl$_3$ is present. The molar ratio of titanium trichloride/aluminum triethyl is about 3.

48 g. of said product, containing 1.2 g. TiCl$_3$, are mixed with 25 g. of polypropylene, containing 3 g. of adsorbed aluminum triethyl. The mixture is introduced into a 3-liter autoclave and the propylene is polymerized at 75° C. and 6 atmospheres, as described in Example 1.

After 7 hours, 230 g. of product, free from initial support material, are obtained with a yield of 55 g. per g. of catalyst and 27 g. per g. TiCl$_3$ per hour.

The characteristics of the polymer, after washing with water and methanol in the presence of HCl, are as follows: [η] (measured in tetrahydronaphthalene at 135° C.)=2.57; residue after the extraction with boiling heptane=85%; flexural rigidity=8,800 kg./cm.$^2$.

*Example 6*

By working as described in Example 1, 250 g. of NaCl granules, containing 3.4 g. of adsorbed aluminum triethyl are added to 100 cc. of boiling TiCl$_4$. After having completed the addition, the mixture is heated at the same temperature for a further 30 minutes and the TiCl$_4$ in excess is recovered by heating up to 150° C. under vacuum.

The product is introduced into a 40-mm. diameter tube, 400 mm.$^3$ long, provided with two openings at the ends, the tube being joined on one side to the vacuum pump, and on the other side a mild stream of preheated nitrogen is introduced.

The mixture is heated at 210° C. for 90 minutes under a 10-mm. Hg vacuum.

250 g. of a dark red-violet colored product, free from powder, are obtained which according to analysis, contain 4.9% of TiCl$_3$. The molar ratio of titanium trichloride/triethylaluminum is about 2.65. 25 g. of said product, containing 1.2 g. of TiCl$_3$, are mixed with 25 g. of polypropylene containing 3 g. of adsorbed aluminum triethyl. The propylene is polymerized in the presence of said catalyst, as described in Example 1, at 75° C. and at 6 atmospheres.

300 g. of polymer, free from the initial support material, are obtained after 7 hours, with a yield of 72 g. per g. catalyst and 36 g. per g. of TiCl$_3$ per hour. The polymer, after washing with water and methanol in the presence of HCl and a drying, has the following characteristics: [η] (measured in tetrahydronaphthalene at 135° C.)=2.60; residue after the extraction with heptane=83.3%; flexural rigidity=9,300 kg./cm.$^2$.

*Example 7*

590 g. of granulated NaCl (diameter 0.1–0.2 mm.) containing adsorbed thereon 7.9 g. of aluminum triethyl, are slowly added over an hour to 250 cc. of TiCl$_4$. The mixture is kept under stirring at 30° C. and the stirring is maintained at this temperature for a further hour. The TiCl$_4$ in excess is recovered by heating at 50° C. under vacuum. The product has a brown color and as distinguished from the foregoing examples, a certain amount of powder is present therein.

The analysis shows that the TiCl$_4$ is still present and therefore the product is washed twice with an anhydrous heptane, and then is dried by heating again at 50° C. under vacuum.

From the analysis, the following results are obtained: TiCl$_3$=2.81%; while tetravalent Ti is present only in an amount of 4%, based on the total titanium.

43 g. of said product, containing 1.2 g. of TiCl$_3$, are mixed with 25 g. of polypropylene, soaked with 6.1 g. of diethyl aluminum monoiodide; the mixture is introduced into a 3-liter autoclave and the propylene is polymerized for 7 hours, as described in Example 1, at 75° C. and at 6 atmospheres. 200 g. of polymer, free from the initial support material, are obtained. After washing with water and methanol in the presence of HCl and drying, the polymer has the following characteristics: [$\eta$] (measured in tetrahydronaphthalene at 135° C.)=2.19; residue from the extraction with boiling heptane=88.8%; flexural rigidity=11,400 kg./cm.$^2$.

*Example 8*

By working according to the procedures and conditions described in Example 1, 30 g. of anhydrous CaCl$_2$ granules having a diameter of 1–1.5 mm., containing 0.88 g. of adsorbed aluminum triethyl in a 30% heptane solution, are added to 20 cc. of TiCl$_4$, kept at the boiling temperature. Then the excess of TiCl$_4$ is eliminated by heating under vacuum up to 150° C. and finally the mixture is heated for a further 3 hours at 300° C. under a 1-mm. Hg vacuum.

A granular product, which possesses a small amount of violet colored powder, is obtained and said product is screened under nitrogen by means of a 100 mesh/cm.$^2$ screen. Thus, 32 g. of a granular product are separated, containing 8.6% TiCl$_3$ and 1.4 g. of a more divided and powder-like product containing on analysis 12% TiCl$_3$.

Therefore, a total of 2.9 g. of TiCl$_3$ have been obtained and therefore the molar ratio of titanium trichloride/triethyl aluminum is 2.4. 95% of TiCl$_3$ is supported on the larger granules of CaCl$_2$, the remaining 5% being on the powder. The granulated portion decants rapidly from a heptane suspension.

*Example 9*

0.85 g. of aluminum triethyl are dissolved in 40 cc. of heptane; 30 g. of anhydrous CaCl$_2$, in granules of 1–1.5 mm. diameter, are impregnated with this solution. The heptane is removed under vacuum by keeping the mixture under stirring in order better to disperse the aluminum triethyl. The granular product is added slowly to 20 cc. of TiCl$_4$ kept at the boiling temperature, according to the methods described in Example 1.

The mixture is then heated up to 150° C. under vacuum, in order to remove the excess TiCl$_4$, and finally the product thus obtained is heated at 250° C. for 3 hours under a 3-mm. Hg vacuum. A granular product is obtained, containing very small amounts of powder, and possessing a violet color.

This product is mixed with 25 g. of granulated polypropylene and containing adsorbed thereon 3 g. of triethyl aluminum. The propylene is polymerized in the presence of the product obtained above, under the conditions described in Example 1 (at 75° C., 6 atmospheres, for 7 hours). 500 g. of polymer free from the initial support materials, are obtained. This polymer, after washing with water-methanol (1:1) in the presence of HCl and after drying shows the following characteristics: [$\eta$] (determined in tetrahydronaphthalene at 135° C.)=2.63; residue after the extraction with boiling heptane =81.8%; flexural rigidy=8,200 kg./cm.$^2$.

*Example 10*

The reduction of TiCl$_4$ is carried out according to the same conditions described in the preceding example, but the final heating is carried out at 300° C. for 3 hours, under a 1-mm. Hg vacuum. All the product, which has a violet color and is almost free from powder, is mixed with 25 g. of polypropylene containing adsorbed thereon 3 g. of aluminum triethyl. By the aid of said catalyst, propylene is polymerized for 8 hours, using the methods described in Example 1 (at 75° C. and at 6 atmospheres). 430 g. of product, free from the initial support material, are obtained. After washing with water and methanol in the presence of HCl, the product has the following characteristics: [$\eta$] (measured in tetrahydronaphthalene at 135° C.)=2.60; residue after heptane extraction= 81.4%; flexural rigidity=8700 kg./cm.$^2$.

*Example 11*

The reduction of TiCl$_4$ is carried out according to the same conditions described in Example 9, but the final heating is carried out at 400° C., under a 1-mm. Hg vacuum. The product thus obtained, possessing a grey-like color, is mixed with 25 g. of polypropylene containing adsorbed thereon 3 g. of aluminum triethyl. Propylene is polymerized with the aid of said catalyst for 7 hours according to the techniques described in Example 1 (at 75° C., 6 atmospheres). 220 g. of polymer are obtained, which after washing with water and methanol in the presence of HCl, has the following characteristics: [$\eta$] (measured in tetrahydronaphthalene at 135° C.)= 3.33; residue after the extraction with boiling heptane= 88.6%; flexural rigidity=9,000 kg./cm.$^2$.

*Example 12*

The reduction of TiCl$_4$ is carried out under the same conditions described in Example 9, using a final heating for three hours at 350° C. under a 1-mm. Hg vacuum. The violet-colored product is then mixed with 25 g. of granulated polypropylene containing adsorbed thereon 1.35 g. of diethyl beryllium and 5 g. of triethyl aluminum etherate.

Propylene is polymerized in the presence of said catalyst, according to the methods described in Example 1.

390 g. of polymer are obtained, which, after washing with water and methanol in the presence of HCl and after drying, has the following characteristics: [$\eta$] (determined in tetrahydronaphthalene at 135° C.)=3.85; residue after the extraction with boiling heptane=96.6%; flexural rigidity=12,400 kg./cm.$^2$.

*Example 13*

150 g. of anhydrous CaCl$_2$ in granules (diameter 1–1.5 mm.) containing adsorbed thereon 4.5 g. of diethylaluminum monochloride, are added to 100 cc. of TiCl$_4$ at its boiling temperature, by working according to the methods described in Example 1.

After removing the excess TiCl$_4$ at 135° C. under vacuum, the mixture is heated for 3 hours at 300° C., under a 1-mm. Hg vacuum. Then 155 g. of a granulated product, quite free from powder and having a violet color, are obtained. The analysis shows that 5.8% of TiCl$_3$ is present. The molar ratio titanium trichloride/diethyl aluminum monochloride=1.55.

20.5 g. of said product, containing 1.2 g. TiCl$_3$, are mixed with 25 g. of polypropylene containing adsorbed thereon 3 g. of aluminum triethyl and using this catalyst, propylene is polymerized according to the methods described in Example 1.

380 g. of polymer, free from the initial support material, are obtained. After washing with water and methanol in the presence of HCl and after drying, the polymer presents the following characteristics: [$\eta$] (measured in tetrahydronaphthalene at 135° C.)=2.2; residue after the extraction with boiling heptane=83.3%; flexural rigidity=9800 kg./cm.$^2$.

*Example 14*

0.84 g. of aluminum triethyl are adsorbed on 50 g. of anhydrous CaCl$_2$ granules (diameter 1–1.5 mm.) which are introduced over a period of 15 minutes into a vertical tubular glass reactor (diameter=40 mm., height= 400 mm.) provided with several recesses so that the granules falling from a recess to another require several seconds to complete the entire tube.

The reactor is heated to 150° C. and traversed by vapors of TiCl$_4$, which material is introduced in the liquid state through a side opening. The drops of TiCl$_4$ evaporate as they enter the reactor and reflux in the reactor itself from a suitable cooler. The aluminum triethyl adsorbed on the CaCl$_2$ granules reacts almost immediately with the TiCl$_4$ vapors and the granules are covered by the reduction product.

After having gone through the tube heated at 150° C., the granules fall into a vessel which is placed below and which is heated at 300° C., and here they are contacted with a mild stream of nitrogen which also removes the last traces of $TiCl_4$ adsorbed thereon.

When all the granules have gone through the reactor, and are collected in the vessel below, they are heated for a further hour at 300° C., under a greater nitrogen flow. The final product, having a red-violet color, and being practically free of powder, is mixed with 25 g. of granulated polypropylene containing adsorbed thereon 3.4 g. of aluminum triethyl. In the presence of said catalyst, the propylene is polymerized for 6 hours, and according to the modalities described in Example 1, at 75° C., under 6 atmospheres.

260 g. of polymer, free from the initial support materials, are obtained. After washing with water and methanol in the presence of HCl and after drying, said polymer presents the following characteristics:

$[\eta]$ (measured in tetrahydronaphthalene at 135° C.) = 3.3;
Residue after the extraction with boiling heptane = 86.4%;
Flexular rigidity = 8900 kg./cm.$^2$.

Example 15

In a continuous plant for the polymerization of propylene in gaseous phase and on a fluidized bed, a test is carried out for 156 hours, by using as catalyst the reduction product of $TiCl_4$ with aluminum triethyl, supported on $CaCl_2$, prepared according to the methods described in Example 8.

This product, which has been additionally heated to 300° C. for 3 hours under a 1-mm. Hg vacuum, contains about 5% $TiCl_3$, is red-violet in colour, and is practically free of powder.

The plant comprises a tubular vertical glass reactor (diameter 120 mm., capacity about 3 liters) over which a dust trap is placed in order to reduce the carrying away of the products. The preheated propylene enters the reactor from the bottom through a plate provided with holes, passes through the bed consisting of growing polymer and catalyst, passes out from the top of the dust trap and after having passed a cyclone and a separator device (in order to remove the more finely divided polymer and catalyst which may be carried away), is recycled by means of a compressor.

The organometallic compound is supplied by saturating the recycled propylene, and titanium trichloride supported on $CaCl_2$ is fed during regular time intervals by means of a suitable dosimeter directly into the reactor. From the reactor, at regular time intervals, the polymer thus formed is discharged in such manner that the fluid bed has always the same height.

At the beginning of the test, a bed consisting of granulated polymer and catalyst supported on $CaCl_2$ is introduced into the reactor. By operating at 100° C. under 2 atmospheres, with linear rates of the propylene in the reactor of 0.3 m./second, by feeding 3 g. of aluminum triethyl per hour, the polymerization is carried out for 156 hours.

Each hour about 1.2 g. of $TiCl_3$, supported on 20 g. of granulated $CaCl_2$, are fed. Over 17 kg. of net polymer are produced during 156 hours. The polymer, which is heavy and granulated (diameter of the granules, 3-5 mm., on the average) is practically from powder.

In the dust chamber on the reactor, no trace of polymer on the walls is observed, and also the cyclone and the filter are free from powdered products.

These facts demonstrate that the catalyst used is a genuine supported catalyst, because it did not separate from the support and did not give powder-like polymer products, although the linear rate of the recycled gaseous propylene was high.

The polymer products discharged from the reactor (the discharge is made each hour) are washed with a mixture of water and methanol (1:1) in the presence of HCl in order to remove the $CaCl_2$ of the support. Said treatment removes also the major part of the catalyst residues and lowers the ash content to a very low percentage.

In Table 1, the characteristics of the washed polymer which are obtained from the different discharged portions, are listed.

A certain amount of polymer, discharged within the 125th–127th hour of the reaction (about 400 g.) is treated, under nitrogen, with 1500 cc. of isobutyl alcohol, containing 15 cc. of an aqueous concentrated HCl solution, at 100° C., by stirring vigorously for an hour. Then 500 cc. of water are added and after a further heating under stirring for an hour, the product is filtered under nitrogen.

The product is washed twice, each time with a mixture consisting of isobutyl alcohol (1500 cc.), water (500 cc.) and HCl (20 cc. of aqueous concentrated solution), and filtered under nitrogen. Finally the polymer, after having been again washed with methanol, is dried.

The percentages of the ashes contained in these products are all below 0.05%.

TABLE 1.—CHARACTERISTICS OF POLYMERS OBTAINED IN A CONTINUOUS PLANT FOR THE GASEOUS PHASE POLYMERIZATION

[Duration of the test=156 hours]

| Hour at which the polymer has been discharged | Intrinsic Viscosity | Residues after the extraction with boiling heptane, percent | Flexural Rigidity, kg./cm.$^2$ |
|---|---|---|---|
| 46 | 2.06 | 84.4 | 8,700 |
| 116 | 2.28 | 79.6 | 8,000 |
| 126 | 1.99 | 85.0 | 9,100 |
| 152 | 2.18 | 81.2 | n.d. |

In addition to the propylene, and butene-1, specifically shown in the above working examples, the catalyst of the present invention is also suitable for use in the polymerization of alpha-olefins generally. As examples of such alpha-olefins may be mentioned alpha-olefins of the formula $CH_2=CHR$, wherein R is a hydrocabon radical, such as pentene-1, hexene-1, heptene-1, 4-methylpentene-1.

As shown by the above examples, the organometallic component, which is employed to reduce the maximum valence state of the transition metal halide, may be either the same or different from the organometallic component which is subsequently added to the reduced transition metal halide to complete the catalyst system.

Many variations and modifications can, of course, be made without departing from the spirit of the present invention.

Having thus fully described the present invention, what is desired to be secured and claimed by Letters Patent is:

1. A process for the preparation of a supported catalyst, suitable for the stereospecific, gaseous phase polymerization of an alpha-olefin containing a halide of a transition metal in a valence state immediately below its maximum valence state and at least one metal alkyl compound of the type $R_mMX_n$ where M is a metal selected from the group consisting of the first, second and third groups of the Mendeleef Periodic Table, R is a hydrocarbon having 1 to 10 carbon atoms, X is a halogen selected from the group consisting of chlorine, bromine and iodine, $m$ is an integer from 1 to 3, $n$ is an integer from 0 to 1, and $m+n$ is the valance of M, wherein said halide of the transition metal in the valence state immediately below its maximum is obtained by reacting at a temperature of from 20° to 160° C. an excess of the halide of the transition metal selected from the group consisting of transition metals from Group IV$b$, V$b$ and VI$b$ of the Mendeleef Periodic Table in its maximum valence state with 0.5 to 3 g. for 100 g. support of an organometallic compound impregnated on a solid inorganic anhydrous salt support compound which is inert towards the catalyst components and has a melting point higher than 400° C. selected from the group consisting of support compounds which are soluble in water and support compounds which are soluble in the washing agents for the alpha-olefin polymer, heating to a temperature of from 50° C. to 400° C. the resulting reaction mixture, and subsequently adding a further amount of a metal alkyl compound to form the catalyst.

2. A process according to claim 1, wherein the heating is carried out under vacuum.

3. A process according to claim 1, wherein said further amount of metal alkyl compound which is added is present impregnated on an inorganic support material.

4. A process according to claim 1, wherein the final molar ratio between the metal alkyl compound and the halide of the transition metal at a valence state immediately below the maximum in the catalyst is between 1:1 and 10:1.

5. A process according to claim 4, wherein the molar ratio is between 3:1 and 7:1.

6. A process according to claim 3, wherein the support is in granulated form.

7. A process according to claim 3, wherein the support comprises calcium chloride.

8. A process according to claim 3, wherein the support comprises calcium carbonate.

9. A process according to claim 3, wherein the support comprises sodium chloride.

10. A process according to claim 1, wherein titanium chloride is used as halide of the transition metal.

11. A process according to claim 1, wherein an organic compound of aluminum is used as the metal alkyl compound, 12. A process according to claim 11, wherein an aluminum trialkyl is used.

13. A process according to claim 12, wherein aluminum triethyl is used.

14. A process according to claim 11, wherein a dialkylaluminum monohalide is used.

15. A process according to claim 14, wherein diethyl aluminum monochloride is used.

16. A process according to claim 14, wherein diethyl aluminum monoiodide is used.

17. A process according to claim 1, wherein a mixture comprising an organic compound of aluminum and an organic compound of beryllium is used as the metal alkyl catalytic compound.

18. A process according to claim 17, wherein a mixture comprising triethyl aluminum etherate and diethyl beryllium is used.

References Cited by the Examiner

UNITED STATES PATENTS

| | | | |
|---|---|---|---|
| 2,956,994 | 10/1960 | Peterlein | 252—429 |
| 2,981,725 | 4/1961 | Luft et al. | 252—429 |
| 3,004,929 | 10/1961 | Lucas et al. | 252—442 |
| 3,032,511 | 5/1962 | Langer | 252—429 |
| 3,047,514 | 7/1962 | Burk et al. | 252—442 |
| 3,054,754 | 9/1962 | Lasky | 252—429 |
| 3,058,963 | 10/1962 | Vandenberg | 252—429 |
| 3,061,600 | 10/1962 | Longiave et al. | 252—429 |
| 3,081,288 | 3/1963 | Edmonds | 260—93.7 |
| 3,082,196 | 3/1963 | D'Alelio | 260—93.7 |
| 3,103,526 | 9/1963 | Jenkner | 260—448 |
| 3,152,088 | 10/1964 | Sandri et al. | 252—429 |

FOREIGN PATENTS 569,443   1/1959   Belgium.

TOBIAS E. LEVOW, *Primary Examiner.*

MAURICE A. BRINDISI, E. STERN, P. D. FREEMAN,
*Assistant Examiners.*